(12) United States Patent
Huston et al.

(10) Patent No.: US 9,513,671 B2
(45) Date of Patent: Dec. 6, 2016

(54) PERIPHERAL RETENTION DEVICE

(71) Applicant: Microsoft Technology Licensing, LLC, Redmond, WA (US)

(72) Inventors: Dave Huston, Seattle, WA (US); Joseph B. Gault, Seattle, WA (US); Aseem Singla, Bellevue, WA (US); Jan Raken, Seattle, WA (US); Andrew William Hill, Redmond, WA (US); Vineet Thuvara, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/450,023

(22) Filed: Aug. 1, 2014

(65) Prior Publication Data

US 2016/0034001 A1 Feb. 4, 2016

(51) Int. Cl.
*G06F 1/16* (2006.01)
*G06F 3/0354* (2013.01)

(52) U.S. Cl.
CPC ............ *G06F 1/1656* (2013.01); *G06F 1/166* (2013.01); *G06F 1/1626* (2013.01); *G06F 1/1643* (2013.01); *G06F 3/03545* (2013.01); *G06F 2200/1632* (2013.01); *G06F 2200/1633* (2013.01); *G06F 2200/1634* (2013.01)

(58) Field of Classification Search
CPC .. G06F 1/1601; G06F 1/1607; G06F 1/1613; G06F 1/1628
See application file for complete search history.

(56) References Cited

U.S. PATENT DOCUMENTS

| 5,576,981 | A | 11/1996 | Parker et al. |
|---|---|---|---|
| 5,719,898 | A | 2/1998 | Davidovici et al. |
| 5,973,677 | A | 10/1999 | Gibbons |
| 6,266,685 | B1 | 7/2001 | Danielson et al. |
| 6,337,924 | B1 | 1/2002 | Smith |
| 6,338,655 | B1 | 1/2002 | Masse et al. |

(Continued)

FOREIGN PATENT DOCUMENTS

| CH | 687757 | 2/1997 |
|---|---|---|
| CN | 1825278 | 8/2006 |

(Continued)

OTHER PUBLICATIONS

"ABBYY FineReader", Available at: http://www.softexia.com/office-tools/abbyy-finereader/, Jul. 11, 2013, 10 pages.

(Continued)

*Primary Examiner* — Gene W Lee
(74) *Attorney, Agent, or Firm* — Qudus Olaniran; Judy Yee; Micky Minhas

(57) ABSTRACT

Peripheral retention device techniques are described. In one or more implementations, a peripheral retention device includes a computing device securing portion and a peripheral securing portion. The computing device securing portion is configured to removably engage a computing device such that the computing device securing portion is securable to and removable from a first side of a housing the computing device using one or more hands of a user. The peripheral securing portion is connected to the computing device securing portion and configured to removably engage a peripheral device via a second side of the housing that opposes the first side of the housing such that the peripheral device is securable to and removable from the peripheral securing portion using one or more hands of a user.

20 Claims, 13 Drawing Sheets

(56) References Cited

U.S. PATENT DOCUMENTS

| | | |
|---|---|---|
| 6,442,764 B1 | 9/2002 | Badillo et al. |
| 6,468,090 B2 | 10/2002 | Belopolsky et al. |
| 6,691,176 B1 | 2/2004 | Narin et al. |
| 6,918,066 B2 | 7/2005 | Dutta et al. |
| 7,055,146 B1 | 5/2006 | Durr et al. |
| 7,151,795 B1 | 12/2006 | Goldburg |
| 7,437,193 B2 | 10/2008 | Parramon et al. |
| 7,535,874 B2 | 5/2009 | Ozluturk et al. |
| 7,623,121 B2 | 11/2009 | Dodge |
| 7,626,358 B2 | 12/2009 | Lam et al. |
| 7,639,876 B2 | 12/2009 | Clary et al. |
| 7,653,893 B2 | 1/2010 | Neumann et al. |
| 7,681,208 B1 | 3/2010 | Pantuso et al. |
| 7,853,646 B2 | 12/2010 | Black et al. |
| 7,905,753 B2 | 3/2011 | Siev et al. |
| 7,921,430 B2 | 4/2011 | Johnson et al. |
| 7,953,295 B2 | 5/2011 | Vincent et al. |
| 8,090,225 B2 | 1/2012 | Lapstun et al. |
| 8,141,059 B2 | 3/2012 | Ding et al. |
| 8,175,613 B2 | 5/2012 | Patil et al. |
| 8,363,036 B2 | 1/2013 | Liang |
| 8,370,629 B1 | 2/2013 | Ngo et al. |
| 8,401,054 B2 | 3/2013 | Myers et al. |
| 8,432,939 B2 | 4/2013 | Bhattad et al. |
| 8,490,084 B1 | 7/2013 | Alford et al. |
| 8,509,563 B2 | 8/2013 | Robinson et al. |
| 8,537,851 B1 | 9/2013 | Gossett et al. |
| 8,606,293 B2 | 12/2013 | Kim et al. |
| 8,634,386 B2 | 1/2014 | Jagger et al. |
| 8,634,849 B2 | 1/2014 | Jovicic et al. |
| 8,639,266 B2 | 1/2014 | Zelinka |
| 8,655,944 B2 | 2/2014 | Silbey et al. |
| 8,700,060 B2 | 4/2014 | Huang |
| 8,794,987 B2 | 8/2014 | Classen et al. |
| 9,397,723 B2 | 7/2016 | Hassan et al. |
| 9,424,048 B2 | 8/2016 | Jakoboski et al. |
| 2001/0009545 A1 | 7/2001 | Schilling |
| 2001/0033218 A1 | 10/2001 | Murata et al. |
| 2002/0015437 A1 | 2/2002 | Li et al. |
| 2002/0036253 A1 | 3/2002 | Lake |
| 2002/0126445 A1 | 9/2002 | Minaguchi et al. |
| 2002/0186710 A1 | 12/2002 | Alvesalo et al. |
| 2002/0187799 A1 | 12/2002 | Haartsen |
| 2003/0061283 A1 | 3/2003 | Dutta et al. |
| 2003/0072467 A1 | 4/2003 | Brundage et al. |
| 2003/0088716 A1 | 5/2003 | Sanders |
| 2003/0110296 A1 | 6/2003 | Kirsch et al. |
| 2003/0126311 A1 | 7/2003 | Kushnirskiy et al. |
| 2003/0132916 A1 | 7/2003 | Kramer |
| 2003/0179731 A1 | 9/2003 | Noguchi et al. |
| 2004/0027387 A1 | 2/2004 | Nason et al. |
| 2004/0031030 A1 | 2/2004 | Kidder et al. |
| 2004/0100457 A1 | 5/2004 | Mandle |
| 2004/0120290 A1 | 6/2004 | Makhijani et al. |
| 2005/0094604 A1 | 5/2005 | Ozluturk et al. |
| 2005/0157459 A1 | 7/2005 | Yin et al. |
| 2005/0240949 A1 | 10/2005 | Liu et al. |
| 2005/0281321 A1 | 12/2005 | Bergstrom et al. |
| 2006/0012567 A1 | 1/2006 | Sicklinger |
| 2006/0081714 A1 | 4/2006 | King et al. |
| 2006/0089171 A1 | 4/2006 | Yoo et al. |
| 2006/0189353 A1 | 8/2006 | Fujishima |
| 2006/0197755 A1 | 9/2006 | Bawany |
| 2006/0238510 A1 | 10/2006 | Panotopoulos et al. |
| 2006/0270351 A1 | 11/2006 | Lastinger et al. |
| 2007/0022390 A1 | 1/2007 | Hillis et al. |
| 2007/0051766 A1 | 3/2007 | Spencer |
| 2007/0147226 A1 | 6/2007 | Khandekar et al. |
| 2007/0174846 A1 | 7/2007 | Johnson et al. |
| 2007/0180441 A1 | 8/2007 | Ding et al. |
| 2007/0247338 A1 | 10/2007 | Marchetto |
| 2007/0283048 A1 | 12/2007 | Theimer et al. |
| 2007/0297323 A1 | 12/2007 | Seki |
| 2008/0024502 A1 | 1/2008 | Nagahara et al. |
| 2008/0077855 A1 | 3/2008 | Lev et al. |
| 2008/0077941 A1 | 3/2008 | Holmes et al. |
| 2008/0104233 A1 | 5/2008 | Smith et al. |
| 2008/0104580 A1 | 5/2008 | Wilkinson |
| 2008/0165754 A1 | 7/2008 | Hu |
| 2008/0180411 A1 | 7/2008 | Solomon et al. |
| 2008/0215796 A1 | 9/2008 | Lam et al. |
| 2008/0232061 A1 | 9/2008 | Wang et al. |
| 2008/0309636 A1 | 12/2008 | Feng et al. |
| 2009/0007001 A1 | 1/2009 | Morin et al. |
| 2009/0102794 A1 | 4/2009 | Lapstun et al. |
| 2009/0187879 A1 | 7/2009 | Ao et al. |
| 2009/0201850 A1 | 8/2009 | Davis et al. |
| 2009/0217241 A1 | 8/2009 | Motoyama et al. |
| 2009/0241020 A1 | 9/2009 | Hsiao |
| 2009/0250366 A1 | 10/2009 | Esfahani |
| 2010/0001963 A1 | 1/2010 | Doray et al. |
| 2010/0021022 A1 | 1/2010 | Pittel et al. |
| 2010/0055928 A1 | 3/2010 | Randall |
| 2010/0075517 A1 | 3/2010 | Ni et al. |
| 2010/0146488 A1 | 6/2010 | Chen et al. |
| 2010/0188338 A1 | 7/2010 | Longe |
| 2010/0231556 A1 | 9/2010 | Mines et al. |
| 2010/0245221 A1 | 9/2010 | Khan |
| 2011/0066973 A1 | 3/2011 | Plom et al. |
| 2011/0083126 A1 | 4/2011 | Bhakta et al. |
| 2011/0093773 A1 | 4/2011 | Yee |
| 2011/0164813 A1 | 7/2011 | Enomoto |
| 2011/0183678 A1 | 7/2011 | Kerpez et al. |
| 2011/0225490 A1 | 9/2011 | Meunier |
| 2011/0234502 A1 | 9/2011 | Yun et al. |
| 2011/0248941 A1 | 10/2011 | Abdo et al. |
| 2012/0071189 A1 | 3/2012 | Mody |
| 2012/0084345 A1 | 4/2012 | Silbey |
| 2012/0087078 A1 | 4/2012 | Medica et al. |
| 2012/0106082 A1 | 5/2012 | Wu et al. |
| 2012/0108180 A1 | 5/2012 | Shibuya |
| 2012/0170966 A1 | 7/2012 | Novak, Jr. |
| 2012/0173226 A1 | 7/2012 | McEvoy et al. |
| 2012/0174224 A1 | 7/2012 | Thomas et al. |
| 2012/0180002 A1 | 7/2012 | Campbell et al. |
| 2012/0189203 A1 | 7/2012 | Lin et al. |
| 2012/0192155 A1 | 7/2012 | Silbey et al. |
| 2012/0249300 A1 | 10/2012 | Avital et al. |
| 2012/0263118 A1 | 10/2012 | Love |
| 2012/0270537 A1 | 10/2012 | Weng et al. |
| 2013/0050922 A1 | 2/2013 | Lee et al. |
| 2013/0076617 A1 | 3/2013 | Csaszar et al. |
| 2013/0093388 A1 | 4/2013 | Partovi |
| 2013/0106723 A1 | 5/2013 | Bakken et al. |
| 2013/0179798 A1 | 7/2013 | Korupolu et al. |
| 2013/0191715 A1 | 7/2013 | Raskovic et al. |
| 2013/0229386 A1 | 9/2013 | Bathiche |
| 2013/0242762 A1 | 9/2013 | Bennett et al. |
| 2013/0279098 A1* | 10/2013 | Cho .................. H05K 7/00 361/679.01 |
| 2013/0288516 A1* | 10/2013 | Chang .................. H01R 13/465 439/488 |
| 2013/0301200 A1* | 11/2013 | Leung .................. G06F 1/1607 361/679.4 |
| 2013/0322423 A1 | 12/2013 | Park et al. |
| 2013/0335330 A1 | 12/2013 | Lane |
| 2013/0335902 A1 | 12/2013 | Campbell |
| 2013/0335903 A1 | 12/2013 | Raken |
| 2013/0342465 A1 | 12/2013 | Bathiche |
| 2013/0346636 A1 | 12/2013 | Bathiche |
| 2014/0028635 A1 | 1/2014 | Krah |
| 2014/0029314 A1 | 1/2014 | Ashcraft et al. |
| 2014/0036430 A1 | 2/2014 | Wroblewski et al. |
| 2014/0061406 A1* | 3/2014 | Chevalier .............. F16M 11/08 248/205.1 |
| 2014/0080501 A1 | 3/2014 | Lee et al. |
| 2014/0094165 A1 | 4/2014 | Karlsson et al. |
| 2014/0098485 A1* | 4/2014 | Vahid .................. G06F 1/1632 361/679.41 |
| 2014/0104279 A1 | 4/2014 | Albrecht |
| 2014/0117928 A1 | 5/2014 | Liao |
| 2014/0128091 A1 | 5/2014 | Engström |
| 2014/0173402 A1 | 6/2014 | Bastide et al. |
| 2014/0173517 A1 | 6/2014 | Chaudhri |

(56) References Cited

U.S. PATENT DOCUMENTS

| | | | |
|---|---|---|---|
| 2014/0187288 A1* | 7/2014 | Correll, Jr. | G06F 1/1607 455/556.1 |
| 2014/0328194 A1 | 11/2014 | Sen et al. | |
| 2014/0341056 A1 | 11/2014 | Carbajal | |
| 2015/0085683 A1 | 3/2015 | Sadek et al. | |
| 2015/0277500 A1 | 10/2015 | Turowski et al. | |
| 2015/0310043 A1 | 10/2015 | Adelman | |
| 2016/0042070 A1 | 2/2016 | Rossi et al. | |
| 2016/0050529 A1 | 2/2016 | Hassan et al. | |
| 2016/0055374 A1 | 2/2016 | Zhang et al. | |
| 2016/0055659 A1 | 2/2016 | Wilson et al. | |
| 2016/0056916 A1 | 2/2016 | Hassan et al. | |
| 2016/0065265 A1 | 3/2016 | Hassan et al. | |
| 2016/0073267 A1 | 3/2016 | Hassan et al. | |
| 2016/0077843 A1 | 3/2016 | Jakoboski et al. | |

FOREIGN PATENT DOCUMENTS

| | | |
|---|---|---|
| CN | 101388057 | 3/2009 |
| CN | 101650659 | 2/2010 |
| CN | 101685487 | 3/2010 |
| CN | 101799855 | 8/2010 |
| CN | 102855232 | 1/2013 |
| DE | 202011103087 | 8/2011 |
| EP | 0611498 | 8/1994 |
| GB | 2102632 | 2/1983 |
| GB | 2178570 | 2/1987 |
| KR | 20030000579 | 1/2003 |
| NL | 1038411 | 5/2012 |
| TW | M482205 | 7/2014 |
| WO | WO-0158098 | 8/2001 |
| WO | WO-02069533 | 9/2002 |
| WO | WO-2009139789 | 11/2009 |
| WO | WO 2010011983 | 1/2010 |
| WO | WO-2010048746 | 5/2010 |
| WO | WO-2012171729 | 12/2012 |
| WO | WO-2013010323 | 1/2013 |

OTHER PUBLICATIONS

"Chronoscan", Available at: http://wwvv.chronoscan.org/index.php?lang=en, Jan. 26, 2013, 3 pages.

"Final Office Action", U.S. Appl. No. 12/897,947, Dec. 19, 2012, 8 pages.

"Final Office Action", U.S. Appl. No. 13/010,552, Sep. 26, 2013, 22 pages.

"Final Office Action", U.S. Appl. No. 13/010,552, Oct. 23, 2014, 22 pages.

"Foreign Office Action", CN Application No. 201210018531.4, Feb. 28, 2015, 12 pages.

"Foreign Office Action", CN Application No. 201210018531.4, Jun. 4, 2014, 16 pages.

"How and Why Would Anyone Validate Their Code", Retrieved from: <http://designreviver.com/articles/how-and-why-would-anyone-validate-their-code/> on Nov. 11, 2010, Aug. 25, 2010, 9 pages.

"HP Code Advisor Version C.02.15 User's Guide", Hewlett-Packard Development Company L.P., Available at <http://docs.hp.com/en/14242/Cadvise_UG.pdf>, Jan. 2010, pp. 1-72.

"International Search Report and Written Opinion", Application No. PCT/US2015/022349, Jun. 25, 2015, 9 Pages.

"International Search Report and Written Opinion", Application No. PCT/US2012/021004, Jul. 30, 2012, 9 pages.

"Introducing OmniPage Cloud Service", Available at: http://www.nuance.com/for-business/by-product/omnipage/omnipage-cloud-services/index.htm, Sep. 4, 2012, 3 pages.

"Non-Final Office Action", U.S. Appl. No. 12/897,947, Jun. 7, 2012, 7 pages.

"Non-Final Office Action", U.S. Appl. No. 13/010,552, May 8, 2015, 27 pages.

"Non-Final Office Action", U.S. Appl. No. 13/010,552, Jul. 8, 2014, 22 pages.

"Non-Final Office Action", U.S. Appl. No. 13/010,552, Aug. 12, 2013, 20 pages.

"Non-Final Office Action", U.S. Appl. No. 14/468,699, May 15, 2015, 6 pages.

"Notice of Allowance", U.S. Appl. No. 12/897,947, Oct. 8, 2013, 8 pages.

"OmniPage Standard 18", Available at: http://ocr-software-review.toptenreviews.com/omnipage-standard-review.html, Oct. 27, 2010, 3 pages.

"Pearl scan solutions", Available at: http://www.pearl-scan.co.uk/document-conversion/OCR-conversion.php, Aug. 21, 2008, 2 pages.

"Restriction Requirement", U.S. Appl. No. 12/897,947, May 11, 2012, 7 pages.

"ScanSnap ix500 Scanning into Excel", Retrieved on: Feb. 20, 2014, Available at: http://www.youtube.com/watch?v=PvpH4NAzUjM, 2 pages.

"Scansnap", Available at: http://scanners.fcpa.fujitsu.com/scansnapit/scansnap-ix500.php, Jan. 11, 2013, 4 pages.

"Understanding the Compatibility View List", Retrieved From: <http://msdn.microsoft.com/en-us/library/dd567845(v=vs.85).aspx> Jun. 11, 2014, Mar. 2011, 5 Pages.

"Visual Basic 6.0 Code Advisor", Retrieved from: <http://msdn.microsoft.com/en-us/vbasic/ms789135.aspx> on Nov. 11, 2010, 2006, 2 pages.

"Web Site Maintenance Tools, Software", Retrieved from: <http://websitetips.com/tools/> on Nov. 11, 2010, Nov. 11, 2010, 10 pages.

Bohge,"The Use of Guard Bands to Mitigate Multiple Access Interference in the OFDMA Uplink", In Proceedings of 13th International OFDM-Workshop, Aug. 2008, 5 Pages.

Chapman,"Review of Cross-Browser Testing Tools", Retrieved From: <http://www.smashingmagazine.com/2011/08/07/a-dozen-cross-browser-testing-tools/> Jun. 9, 2014, Aug. 7, 2011, 13 pages.

Choudhary,"Crosscheck: Combining Crawling and Differencing to Better Detect Cross-browser Incompatibilities in Web Applications", In Proceedings: IEEE Fifth International Conference on Software Testing, Verification and Validation, Apr. 17, 2012, 10 Pages.

Choudhary,"Detecting Cross-browser Issues in Web Applications", In Proceedings: The 33rd International Conference on Software Engineering, May 21, 2011, 3 Pages.

Kang,"An Opportunistic Indoors Positioning Scheme Based on Estimated Positions", In Proceedings: IEEE Symposium on Computers and Communications, Jul. 5, 2009, 7 Pages.

Kim,"Chrome Extensions for Web Development", Retrieved from: <http://googlecode.blogspot.com/2010/05/chrome-extensions-for-web-development.html> on Nov. 11, 2010, May 27, 2010, 4 pages.

Kristianto,"Cross Browser Compatibility Check Tools", Retrieved from: <http://wwvv.ivankristianto.com/web-development/designs/cross-browser-compatibility-check-tools/1202/> on Nov. 11, 2010, Jan. 26, 2010, 14 pages.

Mesbah,"Automated Cross-Browser Compatibility Testing", In Proceedings: the 33rd International Conference on Software Engineering, May 21, 2011, 10 Pages.

Ross,"IE9 Compat Inspector", Retrieved From: <http://blogs.msdn.com/b/ie/archive/2011/04/27/ie9-compat-inspector.aspx> Jun. 11, 2014, Apr. 27, 2011, 7 Pages.

Yucek, "A Survey of Spectrum Sensing Algorithms for Cognitive Radio Applications", In Proceedings: IEEE Communications Surveys & Tutorials, vol. 11 No. 1, Jan. 1, 2009, 15 pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Final Office Action", U.S. Appl. No. 13/603,918, Mar. 21, 2014, 14 pages.

"i-Interactor electronic pen", Retrieved from: <http://www.alibaba.com/product-gs/331004878/i_Interactor_electronic_pen.html> on Jun. 19, 2012, 2012, 5 pages.

"International Search Report and Written Opinion", U.S. Appl. No. PCT/US2013/044871, Aug. 14, 2013, 12 pages.

"International Search Report and Written Opinion", U.S. Appl. No. PCT/US2013/044873, Nov. 22, 2013, 9 pages.

(56) References Cited

OTHER PUBLICATIONS

"International Search Report and Written Opinion", U.S. Appl. No. PCT/US2013/045049, Sep. 16, 2013, 9 pages.
"MPC Fly Music Production Controller", AKAI Professional, Retrieved from: <http://www.akaiprompc.com/mpc-fly> on Jul. 9, 2012, 4 pages.
"neXus Charging Cradle", Retrieved from <http://www.gen-xtech.com/neXus.php> on Jul. 28, 2014, Apr. 17, 2012, 2 pages.
"Non-Final Office Action", U.S. Appl. No. 13/603,918, Dec. 19, 2013, 12 pages.
"Rechargeable Stylus Pen", Retrieved from <http://www.e-pens.com/uk/rechargeable-stylus-pen.html> on Jul. 28, 2014, Jul. 5, 2013, 1 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/603,918, filed Nov. 27, 2013, 8 pages.
"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"Write & Learn Spellboard Advanced", Available at <http://somemanuals.com/Vtech,Write%2526Learn--Spellboard--Adv--71000,Jidfhe.pdf>, 2006, 22 pages.
Bathiche, et al., "Input Device with Interchangeable Surface", U.S. Appl. No. 13/974,749, Aug. 23, 2013, 51 pages.
Lane, et al., "Media Processing Input Device", U.S. Appl. No. 13/655,065, Oct. 18, 2012, 43 pages.
Qin, et al., "pPen: Enabling Authenticated Pen and Touch Interaction on Tabletop Surfaces", In Proceedings of ITS 2010, Available at <http://www.dfki.de/its2010/papers/pdf/po172.pdf>,Nov. 2010, pp. 283-284.
Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Van "Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.
"Final Office Action", U.S. Appl. No. 13/010,552, Oct. 9, 2015, 30 pages.
"FOLDOC: Free On-Line Dictionary of Computing, definition for "Exception"", Retrieved from the Internet: http://web.archive.org/web/20100615211114/http://foldoc.org/exception, 1 page.
"Foreign Office Action", CN Application No. 201210018531.4, Sep. 6, 2015, 13 pages.
"International Search Report and Written Opinion", Application No. PCT/US2015/045985, Oct. 30, 2015, 10 Pages.
"International Search Report and Written Opinion", Application No. PCT/US2015/044402, Nov. 9, 2015, 10 pages.
"International Search Report and Written Opinion", Application No. PCT/US2015/045780, Oct. 22, 2015, 11 pages.
"International Search Report and Written Opinion", Application No. PCT/US2015/042551, Oct. 6, 2015, 13 Pages.
"International Search Report and Written Opinion", Application No. PCT/US2015/044944, Nov. 11, 2015, 13 pages.
"International Search Report and Written Opinion", Application No. PCT/US2015/045468, Oct. 29, 2015, 9 Pages.
"Non-Final Office Action", U.S. Appl. No. 14/229,507, Nov. 10, 2015, 11 pages.
"Non-Final Office Action", U.S. Appl. No. 14/468,699, Oct. 16, 2015, 8 pages.
"Non-Final Office Action", U.S. Appl. No. 14/477,014, Sep. 29, 2015, 18 pages.
Gao, "View: Visual Information Extraction Widget for Improving Chart Images Accessibility", Sep. 30, 2012, 4 pages.
Mishchenko, "Chart image understanding and numerical data extraction", Sixth International Conference on Digital Information Management (ICDIM), Sep. 26, 2011, 20 pages.
Savva, "ReVision: Automated Classification, Analysis and Redesign of Chart Images", Oct. 16, 2011, 10 pages.
"International Search Report and Written Opinion", Application No. PCT/US2015/048218, Dec. 2, 2015, 11 pages.
"International Search Report and Written Opinion", Application No. PCT/US2015/045778, Dec. 15, 2015, 15 pages.
"Non-Final Office Action", U.S. Appl. No. 14/462,820, Dec. 21, 2015, 33 pages.
"Non-Final Office Action", U.S. Appl. No. 14/465,307, Jan. 29, 2016, 8 pages.
Embley,"Table-Processing Paradigms: A Research Survey", International Journal of Document Analysis and Recognition, vol. 8, No. 2-3, May 9, 2006, pp. 66-86.
Sadek,"Method and Apparatus for Performing Carrier Sense Adaptive Transmission in Unlicensed Spectrum", U.S. Appl. No. 61/981,608, filed Apr. 18, 2014, 41 pages.
"Final Office Action", U.S. Appl. No. 14/229,507, Apr. 26, 2016, 15 pages.
"Foreign Notice of Allowance", CN Application No. 201210018531.4, Feb. 4, 2016, 7 pages.
"International Search Report and Written Opinion", Application No. PCT/US2015/049270, Feb. 23, 2016, 14 pages.
"Notice of Allowance", U.S. Appl. No. 14/468,699, Mar. 11, 2016, 8 pages.
"Notice of Allowance", U.S. Appl. No. 14/486,381, Apr. 13, 2016, 7 pages.
"Restriction Requirement", U.S. Appl. No. 14/486,381, Mar. 7, 2016, 6 pages.
"Second Written Opinion", Application No. PCT/US2015/044402, Apr. 6, 2016, 4 pages.
"Corrected Notice of Allowance", U.S. Appl. No. 14/486,381, Jul. 20, 2016, 4 pages.
"Corrected Notice of Allowance", U.S. Appl. No. 14/486,381, May 24, 2016, 6 pages.
"Final Office Action", U.S. Appl. No. 14/462,280, May 20, 2016, 34 pages.
"Final Office Action", U.S. Appl. No. 14/477,014, Jun. 8, 2016, 20 pages.
"International Preliminary Report on Patentability", Application No. PCT/US2015/049270, Jul. 6, 2016, 5 pages.
"International Preliminary Report on Patentability", Application No. PCT/US2015/044402, Jul. 8, 2016, 7 pages.
"International Preliminary Report on Patentability", Application No. PCT/US2015/044944, Jul. 21, 2016, 8 pages.
"Non-Final Office Action", U.S. Appl. No. 14/229,507, Jul. 29, 2016, 24 pages.
"Notice of Allowance", U.S. Appl. No. 14/465,307, Jun. 6, 2016, 7 pages.
"Second Written Opinion", Application No. PCT/US2015/045985, Aug. 1, 2016, 7 pages.
"Supplemental Notice of Allowance", U.S. Appl. No. 14/468,699, May 9, 2016, 4 pages.
"Supplemental Notice of Allowance", U.S. Appl. No. 14/468,699, Jun. 20, 2016, 4 pages.
Non-Final Office Action, U.S. Appl. No. 14/456,561, Sep. 26, 2016, 22 pages.
Non-Final Office Action, U.S. Appl. No. 14/462,820, Aug. 25, 2016, 27 pages.
Notice of Allowance, U.S. Appl. No. 14/465,307, Aug. 12, 2016, 8 pages.
Second Written Opinion, Application No. PCT/US2015/045780, Jul. 12, 2016, 4 pages.
Second Written Opinion, Application No. PCT/US2015/048218, Aug. 9, 2016, 6 pages.

\* cited by examiner

PERIPHERAL RETENTION DEVICE

BACKGROUND

Tablet computing devices may include alternative input devices, such as a stylus. Storing of a stylus, however, may create a couple of design challenges. There are two conventional solutions to this problem. In a first example, an internal slot is used to store and retain the stylus through friction or through a push-push type mechanism.

This may create a problem where extra space and parts are required inside the device. This may also cause an increase in the complexity of the device, overall size of the device which may be undesirable for mobile configurations, and may therefore hinder the user's experience with the device.

In another example a lanyard and a pen cap are used. This conventional solution may also create problems. The lanyard, for instance, may operate somewhat as an uncontrolled appendage and therefore get caught on other objects, pen caps tend to let the pen fall out due to limitations of a retention force that may be used, and so on.

SUMMARY

Peripheral retention device techniques are described. In one or more implementations, a peripheral retention device includes a computing device securing portion and a peripheral securing portion. The computing device securing portion is configured to removably engage a computing device such that the computing device securing portion is securable to and removable from a first side of a housing the computing device using one or more hands of a user. The peripheral securing portion is connected to the computing device securing portion and configured to removably engage a peripheral device via a second side of the housing that opposes the first side of the housing such that the peripheral device is securable to and removable from the peripheral securing portion using one or more hands of a user.

In one or more implementations, a computing device includes a display device, a housing, and one or more modules. The housing has a form factor configured to be held by one or more hands of a user and includes a kickstand that is movable to support different viewing positions of the display device as secured to the housing. The kickstand is configured to removably engage a peripheral retention device such that the peripheral retention device is securable to and removable from the kickstand using one or more hands of a user, the peripheral device is securable to and removable from the peripheral retention device using the one or more hands of a user. The one or more modules are implemented at least partially in hardware and configured to perform one or more operations responsive to inputs received from the peripheral device.

In one or more implementations, a system includes a stylus and a computing device including a housing having a hand-held configuration. The housing includes a kickstand that is movable to support different viewing positions of a display device as secured to the housing. The kickstand is configured to removably engage a peripheral retention device such that the peripheral retention device is securable to and removable from the kickstand using one or more hands of a user and the stylus is securable to and removable from the peripheral retention device using the one or more hands of a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Computing devices may employ a wide range of peripheral devices to support different types of user interaction with the device. This may include input devices that are configured to be used in addition to the computing device, an example of which is a stylus. However, conventional techniques that were utilized to store peripheral devices were often cumbersome and hindered a user's interaction with both the peripheral device and the computing device.

Peripheral retention device techniques are described. In one or more implementations, a peripheral retention device is configured to be secured to a computing device, such as within a cavity of a housing, using a computing device securing portion. The peripheral retention device includes a peripheral securing portion which may be configured as a loop that extends through the housing such that the computing device securing portion and the peripheral securing portion as disposed on opposing sides of the housing. In this way, the peripheral retention device has a sufficient securing force such that a user may grasp a peripheral (e.g., a stylus) and "pick up" the computing device without the computing device being otherwise supported.

Additionally, the loop of the peripheral securing portion may be flexible such that the computing device may still "lay flat" on a surface even when the peripheral retention device is secured to the computing device. The peripheral retention device may be attached to a variety of different locations of a housing of the computing device, such as a kickstand or elsewhere as further described in the following sections.

In the following discussion, an example environment is first described that may employ the techniques described herein. Example mechanisms are also described which may be performed in the example environment as well as other environments. Consequently, use of the example mechanisms is not limited to the example environment and the example environment is not limited to use of the example mechanisms.

Example Environment

Figure 1:
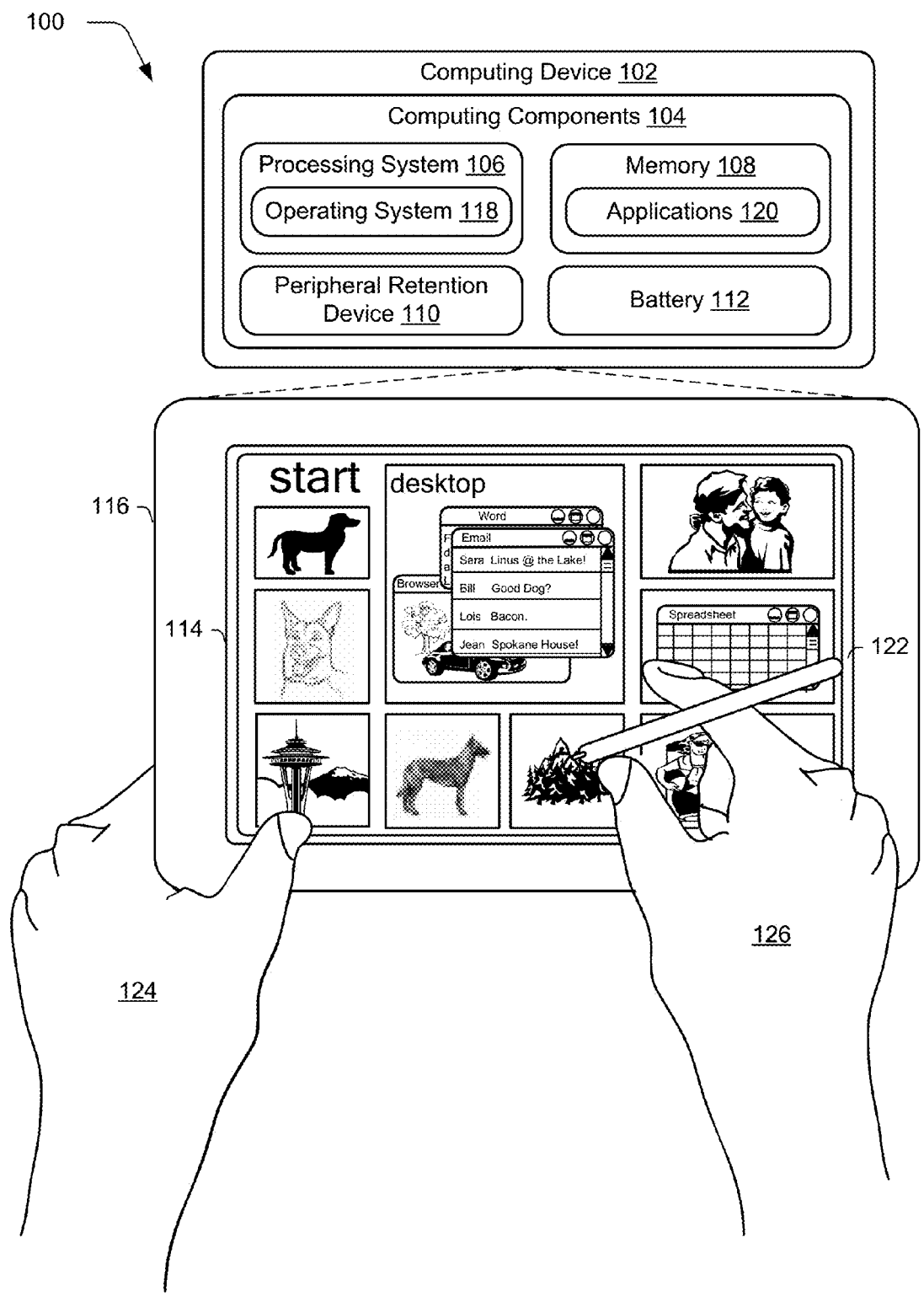
FIG. 1 is an illustration of an environment in an example implementation that is operable to employ the techniques described herein to secure a peripheral device.

FIG. 1 is an illustration of an environment 100 in an example implementation that is operable to employ techniques described herein. The illustrated environment 100 includes a computing device 102 having a plurality of computing components 104 that are implemented at least partially in hardware. Illustrated examples of these computing components 104 include a processing system 106 and a computer-readable storage medium that is illustrated as a memory 108, a peripheral retention device 110, battery 112, and display device 114 that are disposed within and/or secured to a housing 116. Examples of software that is executable on the processing system 106 and storable in memory 108 include an operating system 118 and applications 120.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 is further illustrated as including an operating system 118. The operating system 118 is configured to abstract underlying functionality of the computing device 102 to applications 120 that are executable on the computing device 102. For example, the operating system 118 may abstract the computing components 104 of the computing device 102 such that the applications 120 may be written without knowing "how" this underlying functionality is implemented. The application 120, for instance, may provide data to the operating system 118 to be rendered and displayed by the display device 114 without understanding how this rendering will be performed, may receive inputs detected using touchscreen functionality of the display device 114, and so on. The operating system 118 may also represent a variety of other functionality, such as to manage a file system and user interface that is navigable by a user of the computing device 102.

The computing device 102 may support a variety of different interactions. For example, the computing device 102 may include one or more hardware devices that are manipulable by a user to interact with the device, which may include peripheral devices such as a keyboard, cursor control device (e.g., mouse), a stylus 122 and so on.

In the illustrated example, first and second hands 124, 126 of a user are shown. The first hand 124 of the user is shown as holding a housing 116 of the computing device 102. The second hand 126 of the user is illustrated as providing one or more inputs using the stylus 122 that are detected using touchscreen functionality of the display device 114 to perform an operation, such as to launch an application. Thus, recognition of the inputs may be leveraged to interact with a user interface output by the computing device 102, such as to interact with a game, an application, browse the internet, change one or more settings of the computing device 102, and so forth. Although a stylus 122 is shown, a variety of other peripheral devices are also contemplated, such as a mouse or other cursor control device, output device, external power supply, and so on.

Peripheral devices such as the illustrated stylus 122 may be lost in some instances by a user because the device is not physically attached to the computing device 102, especially in handheld (i.e., mobile) configurations of the computing device 102. However, conventional techniques that were utilized to secure the stylus to the computing device 102 could consume inordinate amounts of room within a housing 116 (e.g., by internal slot is used to store and retain the stylus through friction or through a push-push type mechanism), interfere with a user's interaction with a device (e.g., a lanyard), and so forth. Accordingly, the peripheral retention device 110 may be configured to secure the stylus 122 or other peripheral device to the housing 116 in a manner that does not interfere with a user's interaction with the computing device 102. An example of one such configuration is described as follows and shown in a corresponding figure.

Figure 2:
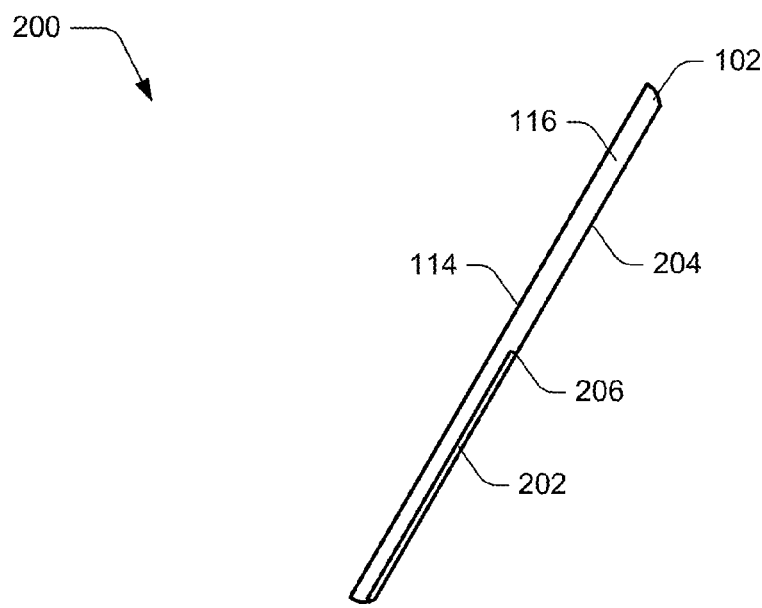
FIG. 2 illustrates a side view of a computing device of FIG. 1 as including a kickstand in a closed position.

FIG. 2 illustrates a side view of the computing device 102 as including a kickstand 202 in a closed position 200. In the closed position 200, the kickstand 202 forms a portion of a rear surface 204 of the computing device 102 such that the kickstand 202 conforms to a surface contour of the computing device 102. For instance, when the kickstand 202 is in the closed position 200, the kickstand 202 integrates into the rest of the housing 116 and does not protrude from a plane formed by the rear surface 204. Generally, the closed position 200 supports various usage scenarios for the computing device 102, such as handheld usage of the computing device 102.

While the kickstand 202 is illustrated in the closed position 200 as being visible from a side view of the computing device 102, this is not intended to be limiting. For instance, as illustrated in some of the accompanying figures, in some implementations the kickstand 202 is positioned within a cutout portion of the rear surface 204 that includes a border that surrounds the kickstand 202 when the kickstand 202 is in a closed position.

Disposed on a front surface is a display device 114, which is representative of functionality to provide visual output for the computing device 102 as previously described. Disposed on the rear surface 204 is the kickstand 202 that enables various operating positions for the computing device 102, such as relative to an adjacent surface. Generally, the kickstand 202 is formed via a planar portion of material, such as instances and/or combinations of plastic, metal, various alloys, carbon fiber, and so forth.

Figure 3:
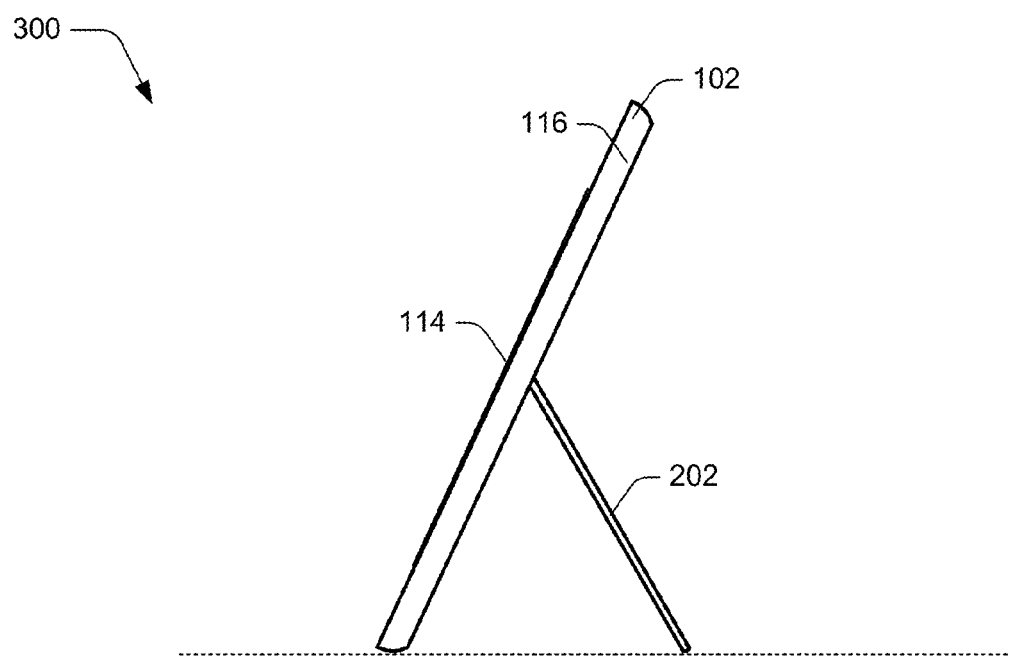
FIG. 3 illustrates a side view of the computing device of FIG. 1 with an example open position for the kickstand.

As further detailed herein, the kickstand 202 is adjustably attached to the rear surface 204 such that the kickstand 202 may be moved to different positions relative to the rear surface 204. In at least some implementations, this enables the kickstand 202 to be closed to support handheld usage of the computing device 102 as shown in FIG. 2. As illustrated in FIG. 3, the kickstand 202 may also be opened such that the computing device 102 may recline on a surface shown in phantom and be supported at least partially by the kickstand 202. For instance, the kickstand 202 enables the computing device 102 to recline against an adjacent surface, such as a desk, a table, a user's lap, and so forth.

In at least some implementations, the kickstand 202 includes multiple preset open positions that enable different reclining angles, e.g., different angles of the front surface of the display device 114 relative to the surface. The kickstand 202, for instance, is attached to the computing device 102 via a hinge mechanism 206 that enables movement of the kickstand 202 relative to the rear surface 204. The hinge mechanism 206 may thus include a closed position that enables the kickstand 202 to be placed in a closed position 200. The hinge mechanism 206 may further include one or more preset open positions that enable the kickstand 202 to be placed in one or more open positions to support different operating positions of the computing device 102, an example of which is described as follows and shown in a corresponding figure.

FIG. 3 illustrates a side view of the computing device 102 with an example open position 300 for the kickstand 202. In the open position 300, the kickstand 202 is positioned such that the computing device 102 may be placed on a surface at an angle to permit viewing of the display device 114.

Figure 4:
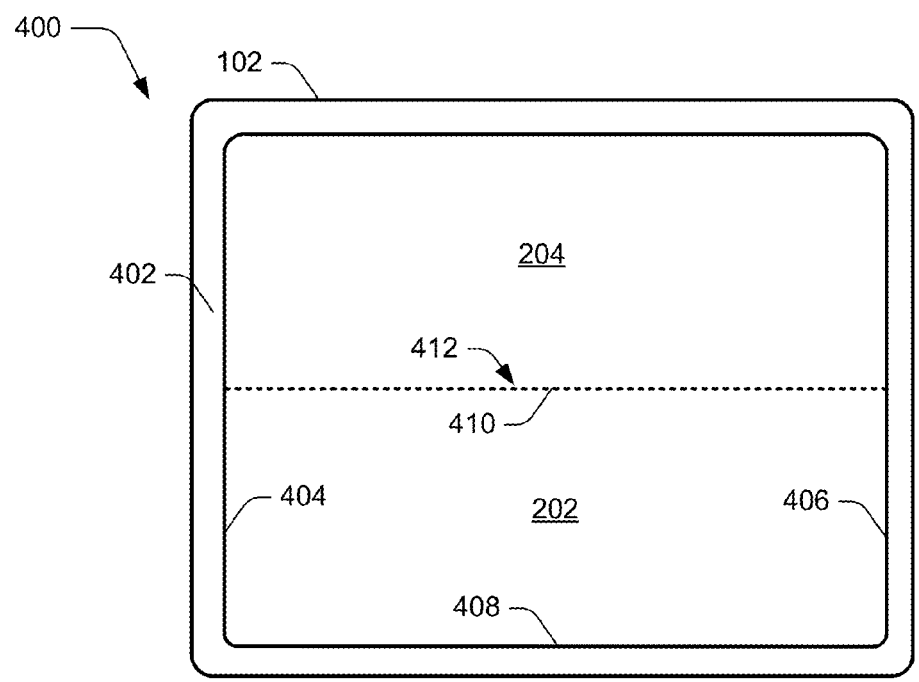
FIG. 4 illustrates a rear view of the computing device with the kickstand in a closed position

FIG. 4 illustrates a rear view 400 of the computing device 102 with the kickstand 202 in a closed position, e.g., the position 200 introduced above in FIG. 2. In this particular implementation, the rear surface 204 has a peripheral portion 402 that forms an external border of the rear surface 204.

The kickstand 202 includes a first side edge 404, a second side edge 406, a bottom edge 408, and a top edge 410. As illustrated, the peripheral portion 402 surrounds the first side edge 404, the second side edge 406, and the bottom edge 408. The top edge 410 represents a region where the kickstand 202 connects to the computing device 102.

Figure 5:
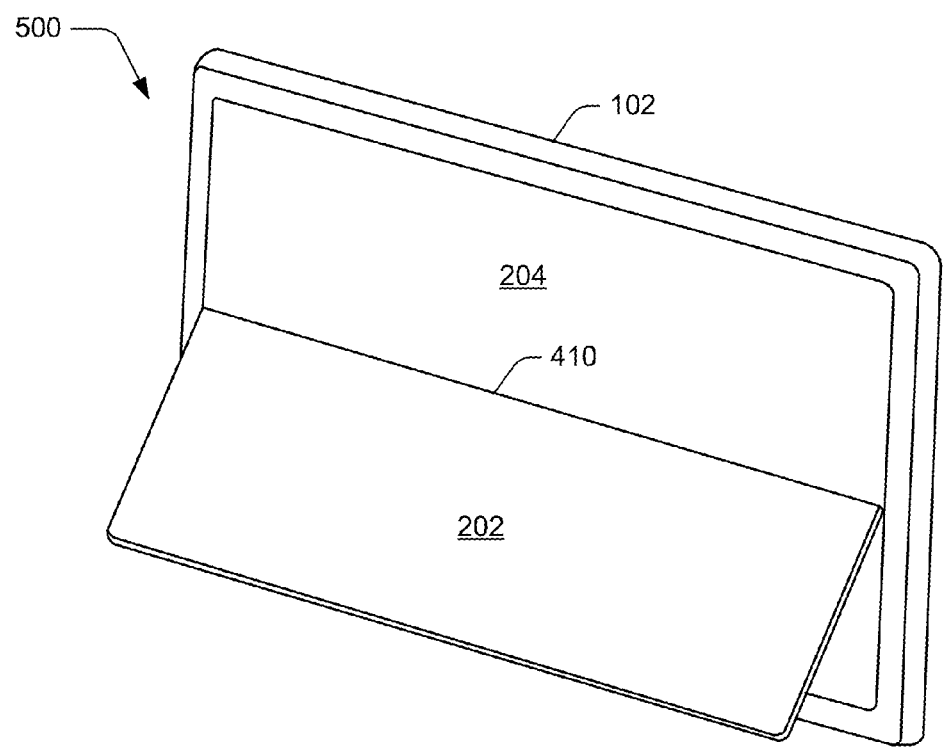
FIG. 5 illustrates a rear view of the computing device with the kickstand in an open position.

FIG. 5 illustrates a rear view 500 of the computing device 102 with the kickstand 202 in an open position, e.g., the open position 300 discussed in relation to FIG. 3. The rear view 500 illustrates that when the kickstand 202 formed as a single plate that extends away from the computing device 102 as described above.

Figure 6:
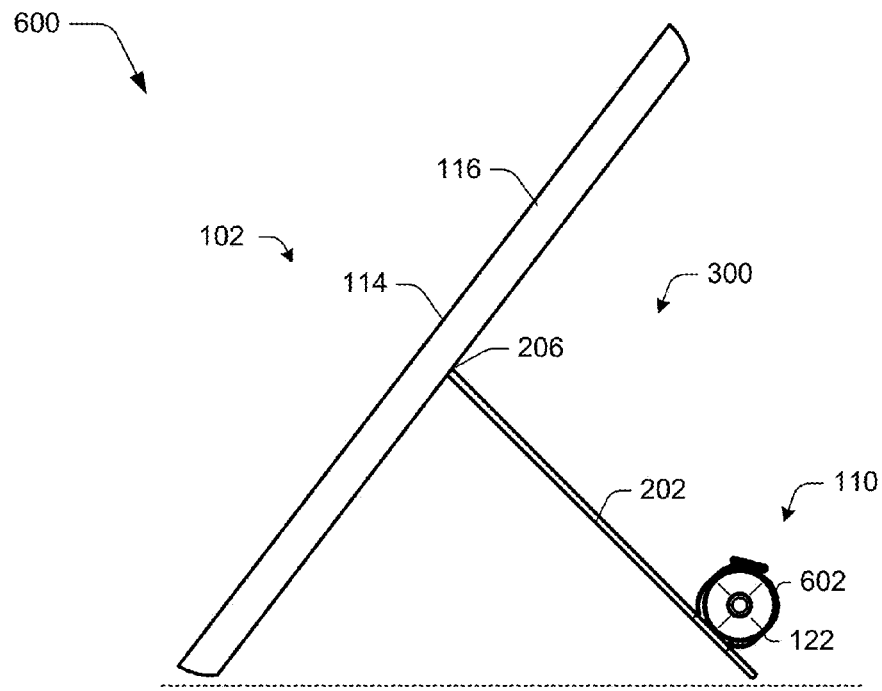
FIGS. 6 and 7 illustrate a side view a rear view of the computing device, respectively, in an example open position for the kickstand that includes a peripheral retention device as securing a stylus.
Figure 7:
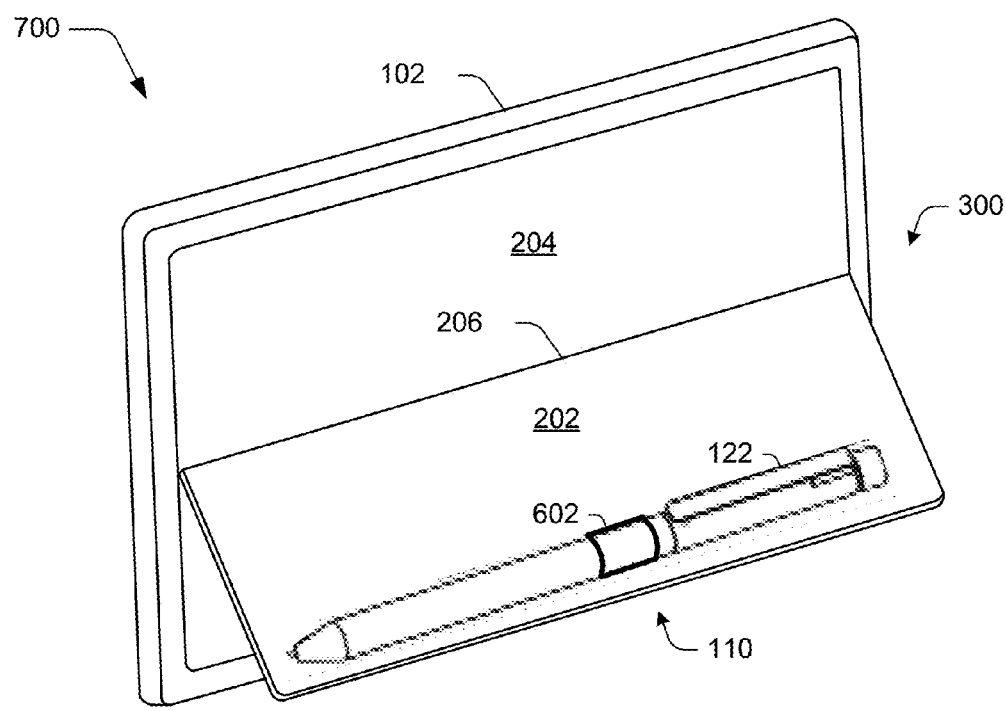

FIGS. 6 and 7 illustrate a side view 600 and a rear view 700 of the computing device 102, respectively, in an example open position 300 for the kickstand 202 that includes a peripheral retention device 110 as securing a stylus 122. As before, in the open position 300, the kickstand 202 is positioned such that the computing device 102 may be placed on a surface at an angle to permit viewing of the display device 114.

In this example, however, a part of the housing 116 (e.g., the kickstand 202 in this instance) has secured thereto a peripheral retention device 110. Further, the peripheral retention device 110 is also illustrated as securing a peripheral, in this instance a stylus 122. Thus, the stylus 122 may be secured to the computing device 102 through use of the peripheral retention device 110.

The peripheral retention device 110 may be configured in a variety of ways. In the illustrated example, the peripheral retention device 110 includes a peripheral securing portion 602 that is configured to secure a peripheral, such as the stylus 122. The peripheral securing portion 602 may also be configured in a variety of ways. In the illustrated example, the peripheral securing portion 602 assumes a complementary shape of the peripheral being secured. This may be performed through use of a flexible material, such as a fabric, rubber, or elastic material. Other examples are also contemplated including examples in which the peripheral securing portion 602 is not flexible, is molded to conform to an outer surface of a peripheral device to be retained, and so on.

The peripheral securing portion 602 may also be configured to provide a biasing force to secure the peripheral. For example, when formed as an elastic loop, the elasticity may bias the peripheral toward the housing 114 (e.g., kickstand) and thereby retain the peripheral against the housing 114. Other examples are also contemplated, such as through use of a spring and so on. Thus, the peripheral retention device 110 may assume a variety of different configurations, an example of which is described as follows and shown in a corresponding figure.

Figure 8A:
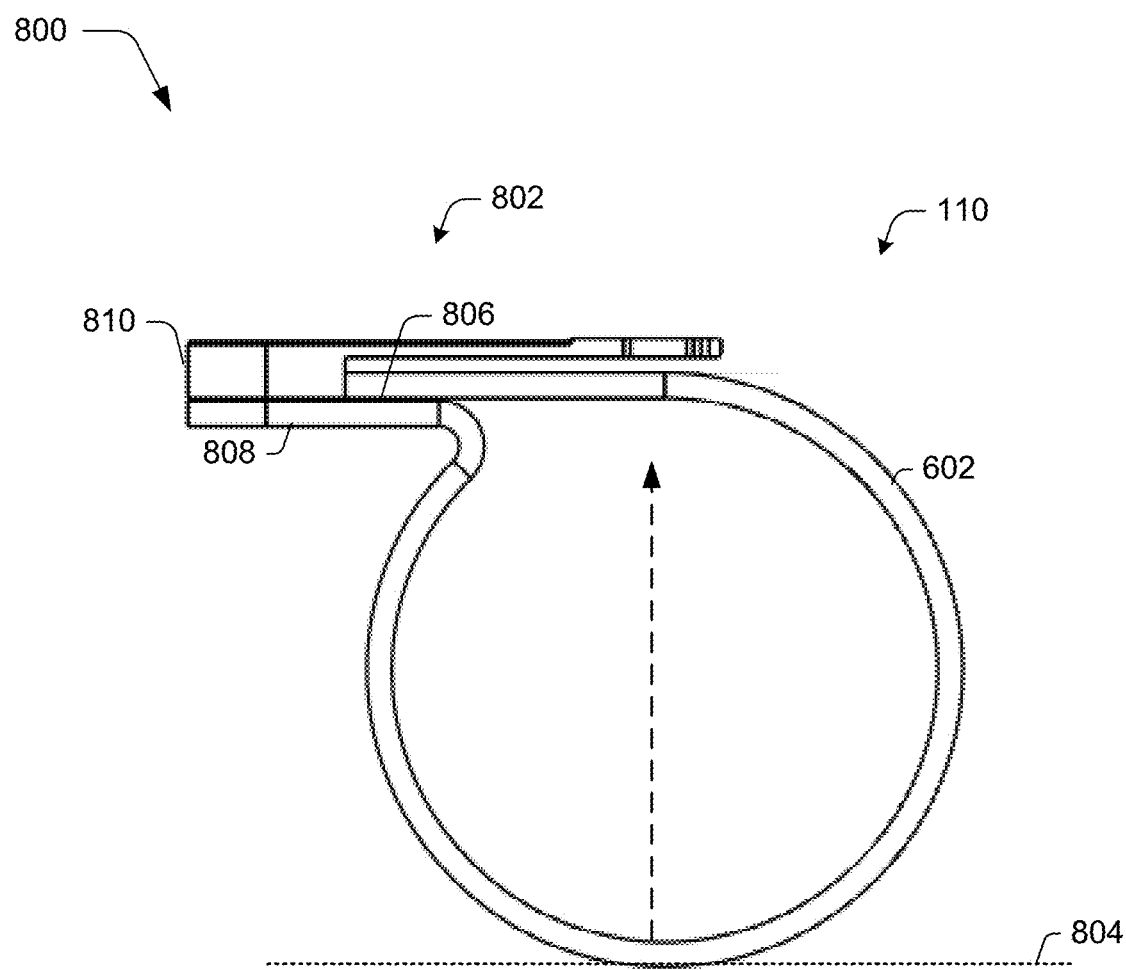
FIG. 8a shows an example of the peripheral retention device of FIGS. 6 and 7 in greater detail.
Figure 8B:
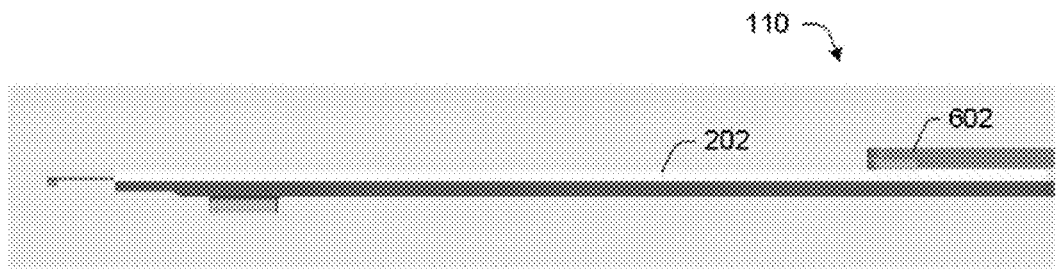
FIGS. 8b and 8c shown the peripheral retention device of FIG. 8a as being in a compressed state.
Figure 8C:
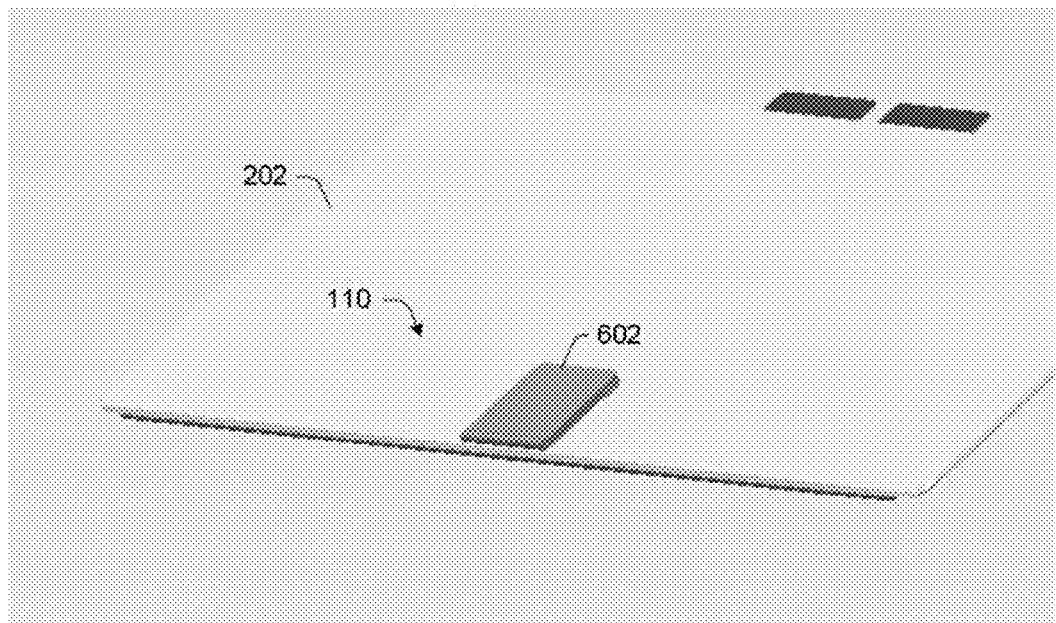

FIG. 8a shows an example 800 of the peripheral retention device 110 of FIGS. 6 and 7 in greater detail. The peripheral retention device 110 includes a peripheral securing portion 602 as previously described along with a computing device securing portion 802. The peripheral securing portion 602 may be configured from a flexible material, such as a fabric, rubber, elastic, or other material such that the peripheral securing portion 602 may "flatten" as shown by the phantom arrow when placed against a surface, e.g., when the computing device 102 is placed on a surface 804 such that the peripheral securing portion 602 is compressed between the surface 804 and the computing device 102 of FIG. 1. In this way, the peripheral retention device 110 does not interfere with a user's interaction with the computing device 102. As shown in FIGS. 8b and 8c, for instance, the peripheral securing portion may assume a compressed state such that it has a thickness of just two layers of fabric. Other examples are also contemplated.

The computing device securing portion 802 is configured to removably engage a computing device 102 as shown in FIG. 8a such that the computing device securing portion is securable to and removable from a housing 116 of the computing device 102 of FIGS. 1-7. This may be performed in a variety of ways, further discussion of which may be found in relation to FIGS. 11-12.

Figure 9:
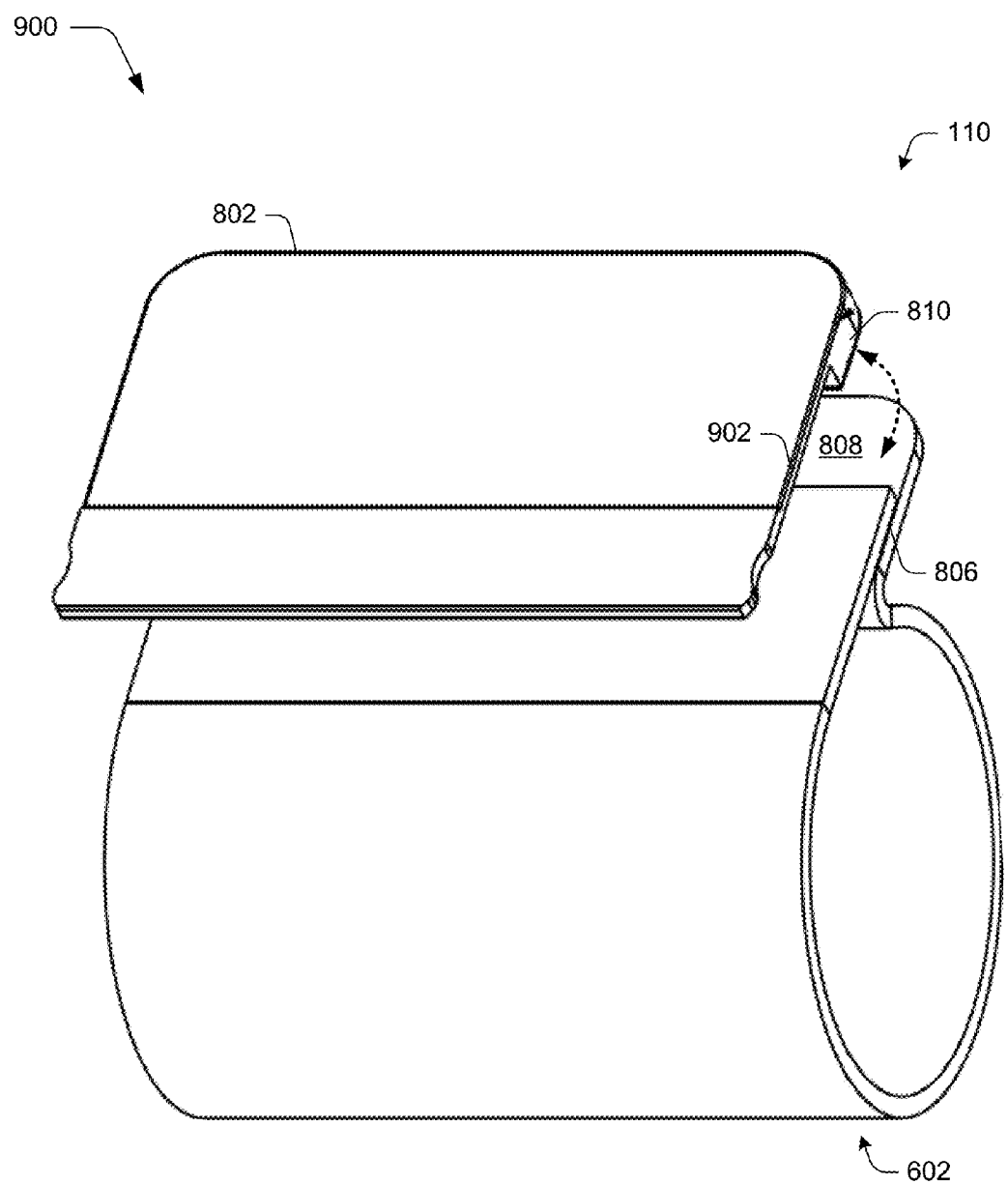
FIG. 9 depicts an example of the peripheral retention device as configured as two separate portions that may be joined together.

As shown in the example 900 of FIG. 9, the peripheral retention device 110 may be configured as two separate portions (e.g., the computing device securing portion 802 and the peripheral device portion 806) that may be joined together, such as through an adhesive, sonic welding, heat activated film, and so forth. Other examples are also contemplated, such as through formation as a single integral unit.

Returning again to FIGS. 8 and 9 in tandem, the peripheral device portion 602 is formed as a loop by securing material of the device to itself to form a secured part 806, such as through an adhesive, sonic welding, and so on of fabric of the loop. The peripheral device portion 602 is secured in a staggered format such that a layered structure is formed having a length 808 of material that extends from the secured part 806.

This length 808 of material is then attached to a raised part 810 (e.g., "foot") of the computing device securing portion 802, thereby forming a layered structure in which the secured part 806 is nested within a recess of the computing device securing portion 802. In this way, an overall thickness of the peripheral retention device 802 may be reduced, thereby limiting interference of the device with normal usage of a user. Further, the raised part 810 supports the loop of the peripheral device portion 602 in a direction perpendicular to the computing device securing portion 802 which provide strong mechanical retention. Further, this may be configured such that only the fabric of the loop of the peripheral device portion 602 is visible to a user as shown and described in relation to FIG. 12.

Figure 10:
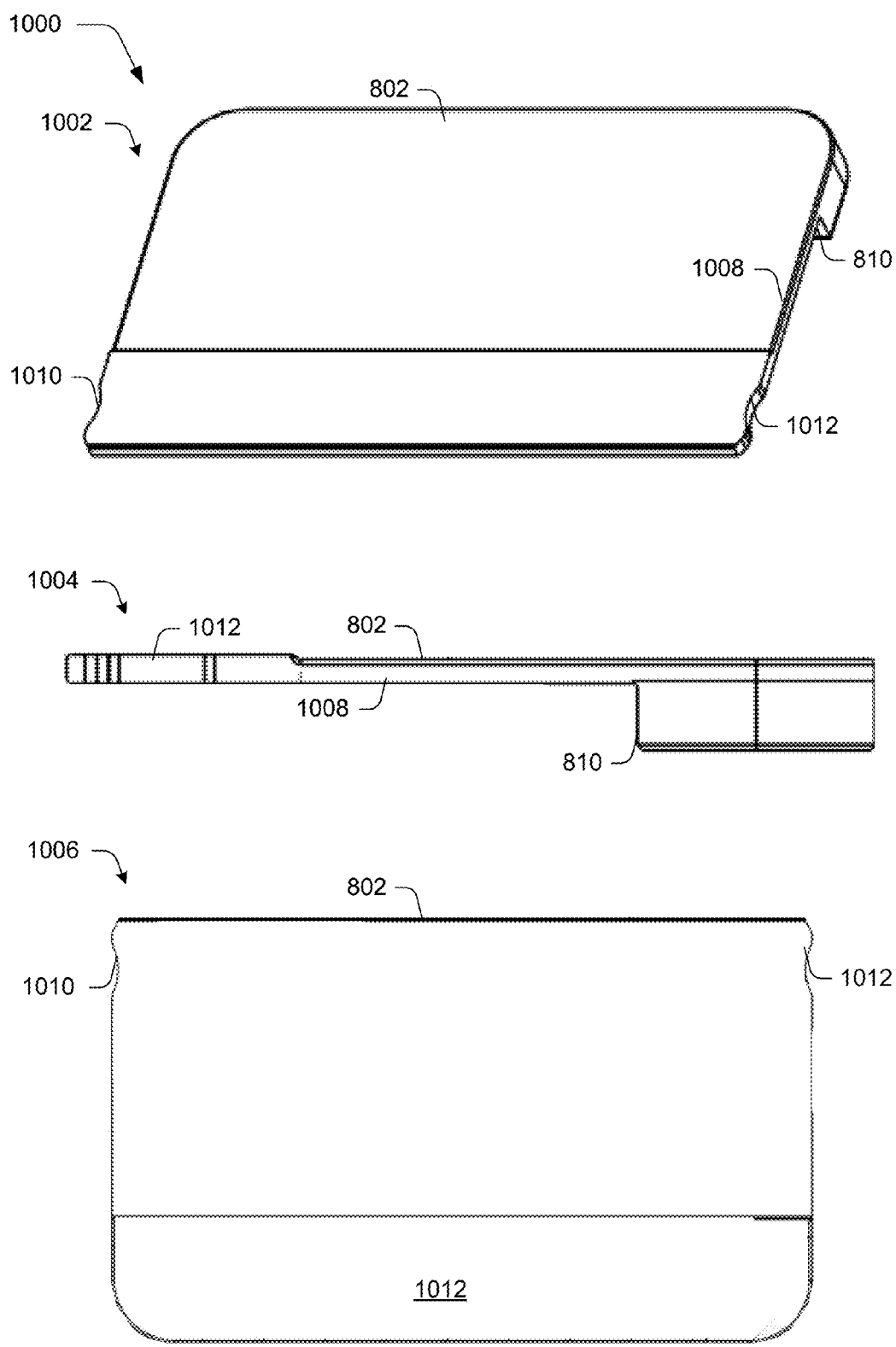
FIG. 10 depicts an example showing first, second, and third views showing a computing device securing portion of FIGS. 8 and 9 in greater detail.

FIG. 10 depicts an example showing first, second, and third views 1002, 1004, 1006 of the computing device securing portion 802 of FIGS. 8 and 9. The first view 1002 is an isometric view, the second view 1004 is taken from the side, and the third view 1006 is taken of a top of the computing device securing portion 802. The computing device securing portion 802 includes surfaces that complement the staggered configuration of the peripheral device portion 702, e.g., as formed as a loop that includes a secured part 806 and length of material that extends from the secured part 806.

For example, the computing device securing portion 802 may include a raised part 810 that is configured to be secured to the length 808 of the peripheral device portion 702 as previously described. The computing device securing portion 802 also includes a recessed surface 1008 in relation to the raised part 810 that forms the cavity between the computing device securing portion 802 and the peripheral device portion 702 as previously described in relation to FIGS. 8 and 9.

The computing device securing portion 802 also includes indentions 1010, 1012 on opposing sides of the computing device securing portion 802 are configured to engage complementary shapes of the housing 116 of the computing device. This may be utilized to help support the high retention force previously described, further discussion of which may be found in the following as relates to installation and removal of the peripheral retention device 110 to and from the housing 116 of the computing device 102.

Figure 11:
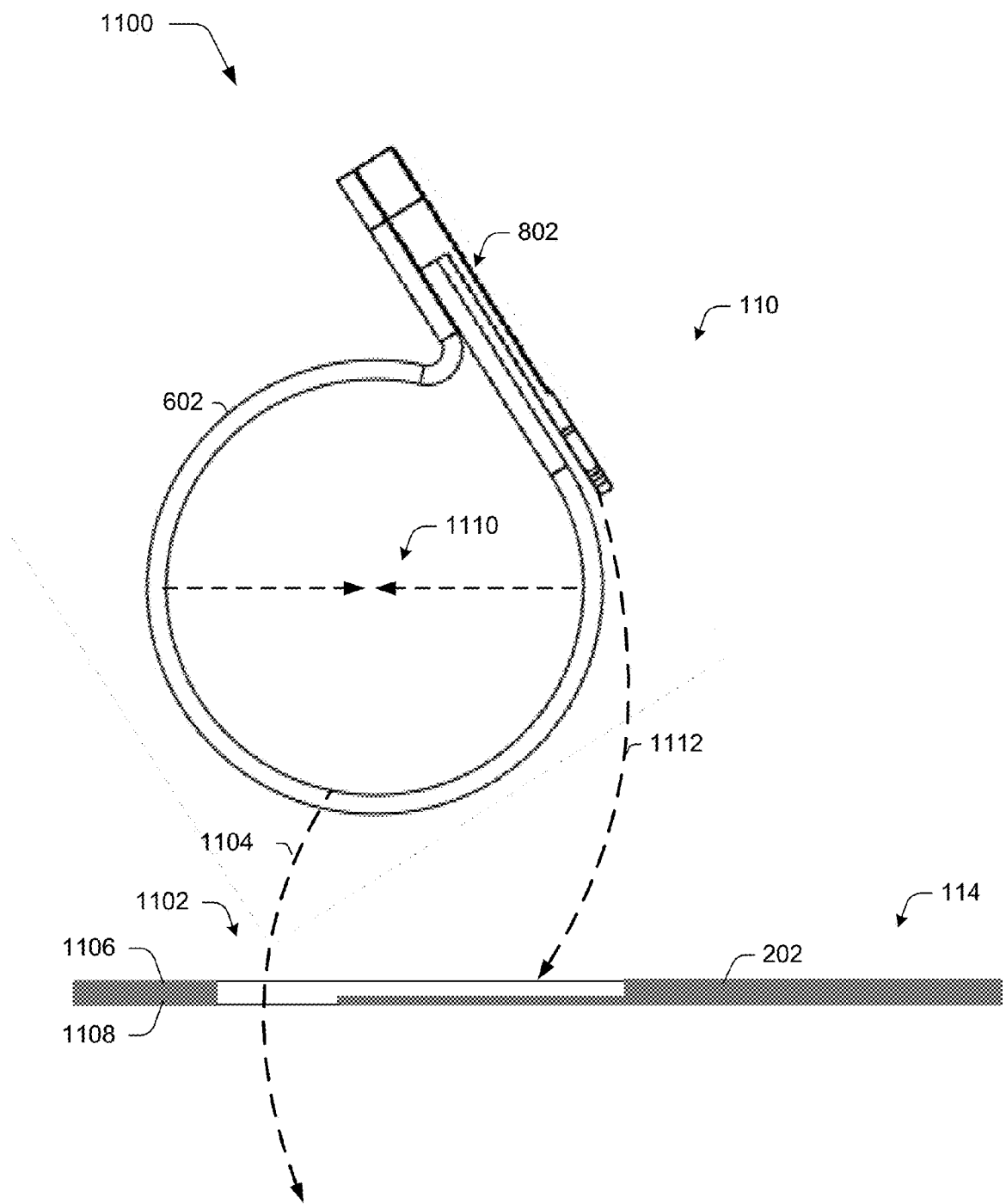
FIG. 11 depicts an example of installation and removal of the peripheral retention device of FIG. 1 to and from the housing.

FIG. 11 depicts an example 1100 of installation and removal of the peripheral retention device 110 to and from the housing 114. In this example, a kickstand 202 of the housing 114 is illustrated in a cross-sectional view. The kickstand 202 includes a cavity 1102 includes edges having a complementary shape to that of the computing device securing portion 802 of the peripheral retention device.

To install the peripheral retention device 110, a loop of the peripheral device portion 602 may be pulled 1104 from a first side 1106 of the kickstand 202 through the cavity 1102 to a second side 1108 of the kickstand 202. This causes the peripheral device portion 602 to compress 1110 (e.g., opposing sides of the loop move toward each other as illustrated by the phantom arrows) to fit through the cavity 1102. This motion may continue to position 1112 edges of the computing device securing portion 802 of the peripheral retention device 110 to engage edges of the cavity 1102 in the kickstand 202, further discussion of which may be found in the following and shown in a corresponding figure.

Figure 12:
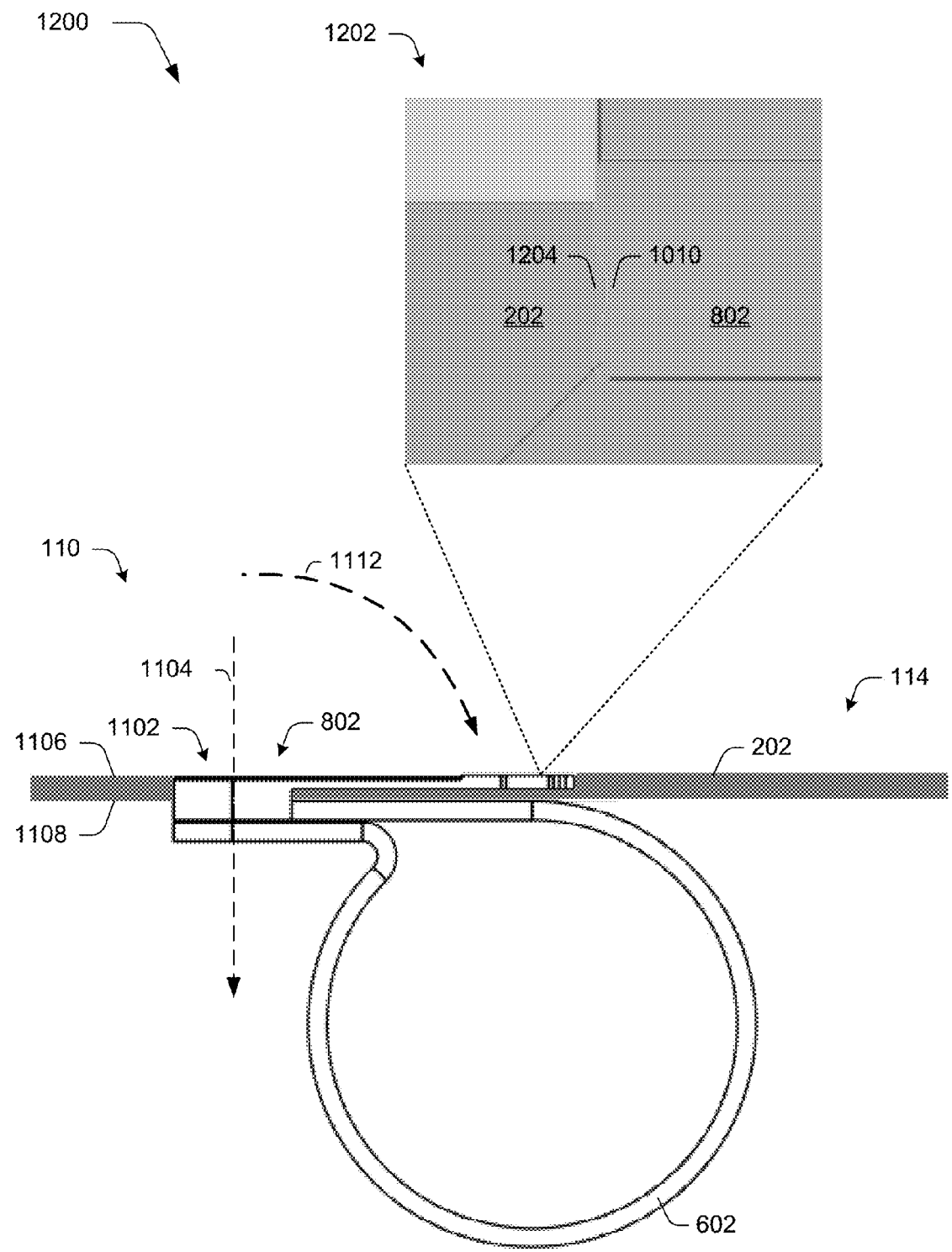
FIG. 12 depicts an example in which the peripheral retention device of FIG. 1 is secured to a cavity of a kickstand of the housing.

FIG. 12 depicts an example 1200 in which the peripheral retention device 110 is secured to the cavity 1102 of the kickstand 202 of the housing 114. As installed, the peripheral securing portion 602 is disposed on the second side of the kickstand 202 whereas the computing device securing portion 802 is secured to edges of the cavity 1102 of the first side 1106 of the housing.

The computing device securing portion 802, for instance, may flex and "click" to bias contact of edges of the portion and the cavity as a result of the force provided by the computing device securing portion 802. This process as described in FIGS. 11 and 12 may also be reversed to remove the peripheral retention device 110 from being secured to the computing device 102. In this way, the peripheral retention device 110 may be secured to and removed from the computing device 102 by one or more hands of a user without the use of tools.

As previously described in relation to FIG. 10 and shown in the expanded view 1202 in the figure, the computing device securing portion 802 may include an indention 1010 that is configured to engage a complementary shape 1204 of the housing 114, e.g., the kickstand 202 in this example. This mechanism is configured to support a high retention force between the peripheral retention device 110 and the kickstand 202.

For example, a user may grasp the peripheral securing portion 602 and/or a peripheral secured by that portion with one or more hands and pull away from the kickstand. This may result in a force that mimics the force used to pull 1104 the peripheral securing portion through the cavity 1102. However, mechanical engagement of the edges of the indention 1010 to edges of the complementary shape 1204 of the cavity 1102 may be configured to resist this movement, which in the illustrated instance is configured to provide a securing force as generally perpendicular to the pull 1104. Other examples are also contemplated which may be used in addition to or separate from the previous examples, such as to support magnetic attachment, use of an adhesive, and so on.

Thus, as installed in this example the computing device securing portion 802 is not visible via the second side 1108 of the kickstand 202. Further, as previously described the peripheral device portion 602 may be configured to be flexible and thus minimize intrusion of the peripheral retention device 110 on a user's interaction with the computing device 102 when not in use, e.g., when placed on a surface. A variety of other examples of peripheral retention device configurations are also contemplated, discussion of which may be found in the following and shown in the corresponding figures.

Figure 13:
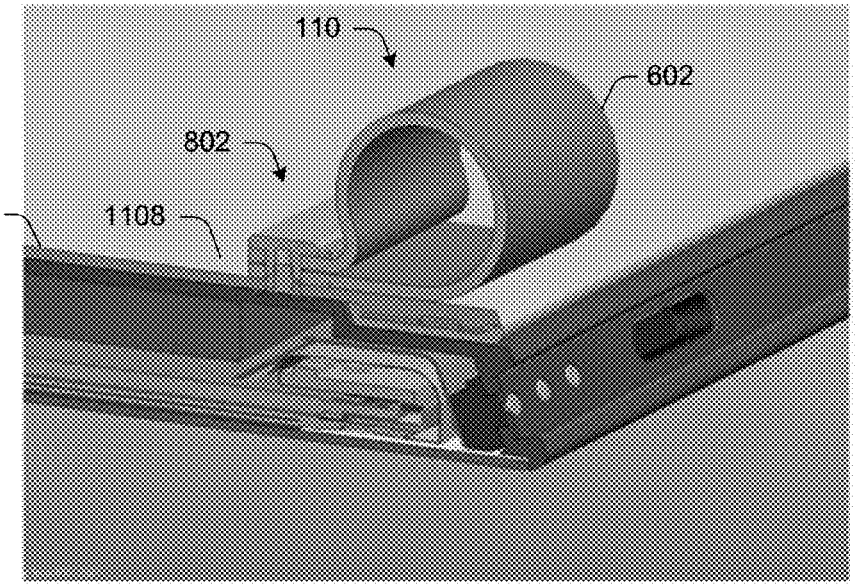
FIG. 13 depicts another example of the peripheral retention device of FIG. 1.

FIG. 13 depicts another example 1300 of the peripheral retention device 110 of FIG. 1. In this example, the computing device securing portion 802 is formed as a plate that secures the peripheral securing portion 602 to the second side 1108 of the kickstand 202. The peripheral securing portion 602 may be configured to be flexible and provide a biasing force to a peripheral device as before.

Figure 14:
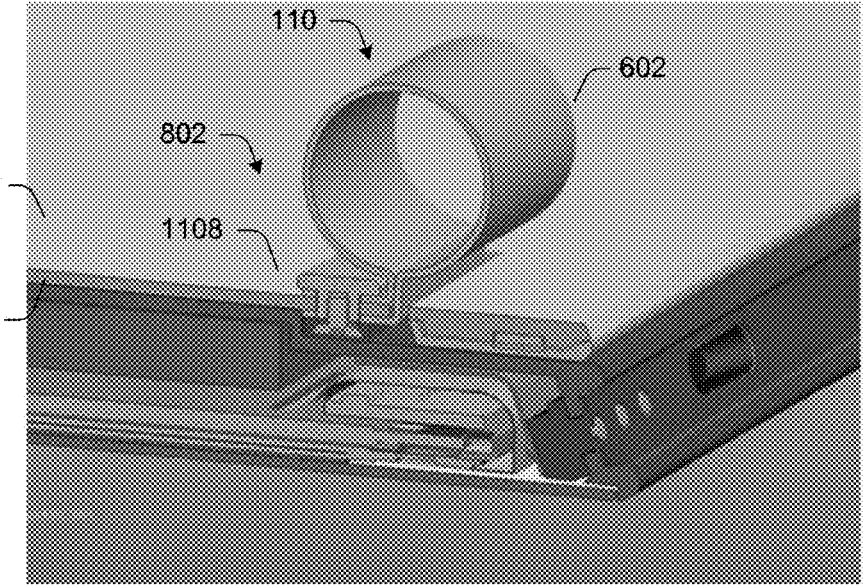
FIG. 14 depicts yet another example of the peripheral retention device of FIG. 1.

FIG. 14 depicts yet another example 1400 of the peripheral retention device 110 of FIG. 1. In this example, the computing device securing portion 802 is also formed as a plate that secures the peripheral securing portion 602 to the second side 1108 of the kickstand 202. However, in this example 1440 the peripheral securing portion 602 is secured to both the first and second sides 1106, 1108 of the kickstand 202 through use of the computing device securing portion 802. For example, one side of the loop may be tucked under the computing device securing portion 802 and the other may be threaded under the kickstand 202. As before, the peripheral securing portion 602 may be configured to be flexible and provide a biasing force to a peripheral device as before.

Figure 15:
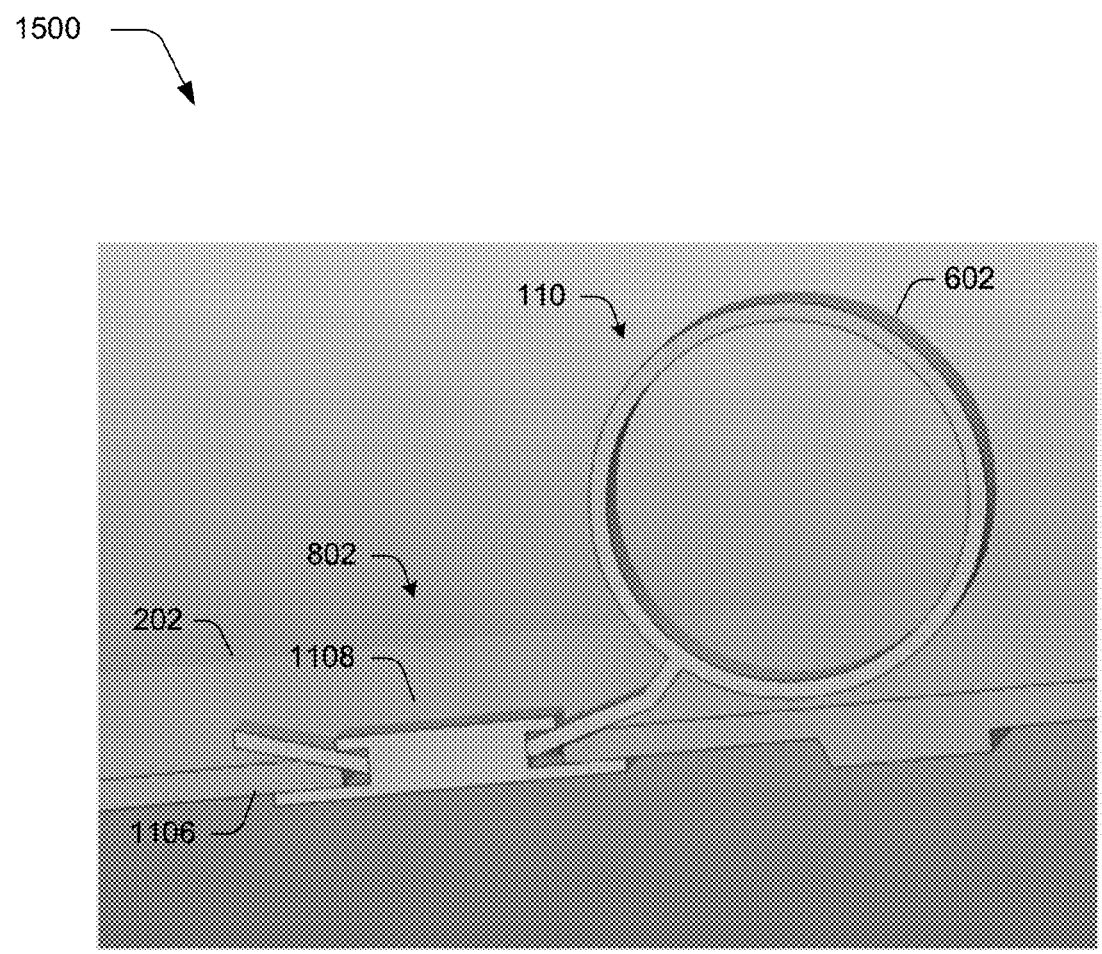
FIG. 15 depicts a further example of the peripheral retention device of FIG. 1.

FIG. 15 depicts a further example 1500 of the peripheral retention device 110 of FIG. 1. In this example, the computing device securing portion 802 is also formed as a plate that secures the peripheral securing portion 602 to the first side 1106 of the kickstand 202, e.g., through welding. The peripheral securing portion 602 in this instance is not generally flexible in that it is not configured to be flattened and is formed in a complementary shape of a corresponding peripheral device, e.g., the stylus. A variety of other examples are also contemplated without departing from the spirit and scope thereof, such as example that involve use of a clip having rolled ends, "stretching" of a loop of the peripheral securing portion over a computing device securing portion formed as a "pill", use of screws on the first 1106 side, and so forth.

Example System and Device

Figure 16:
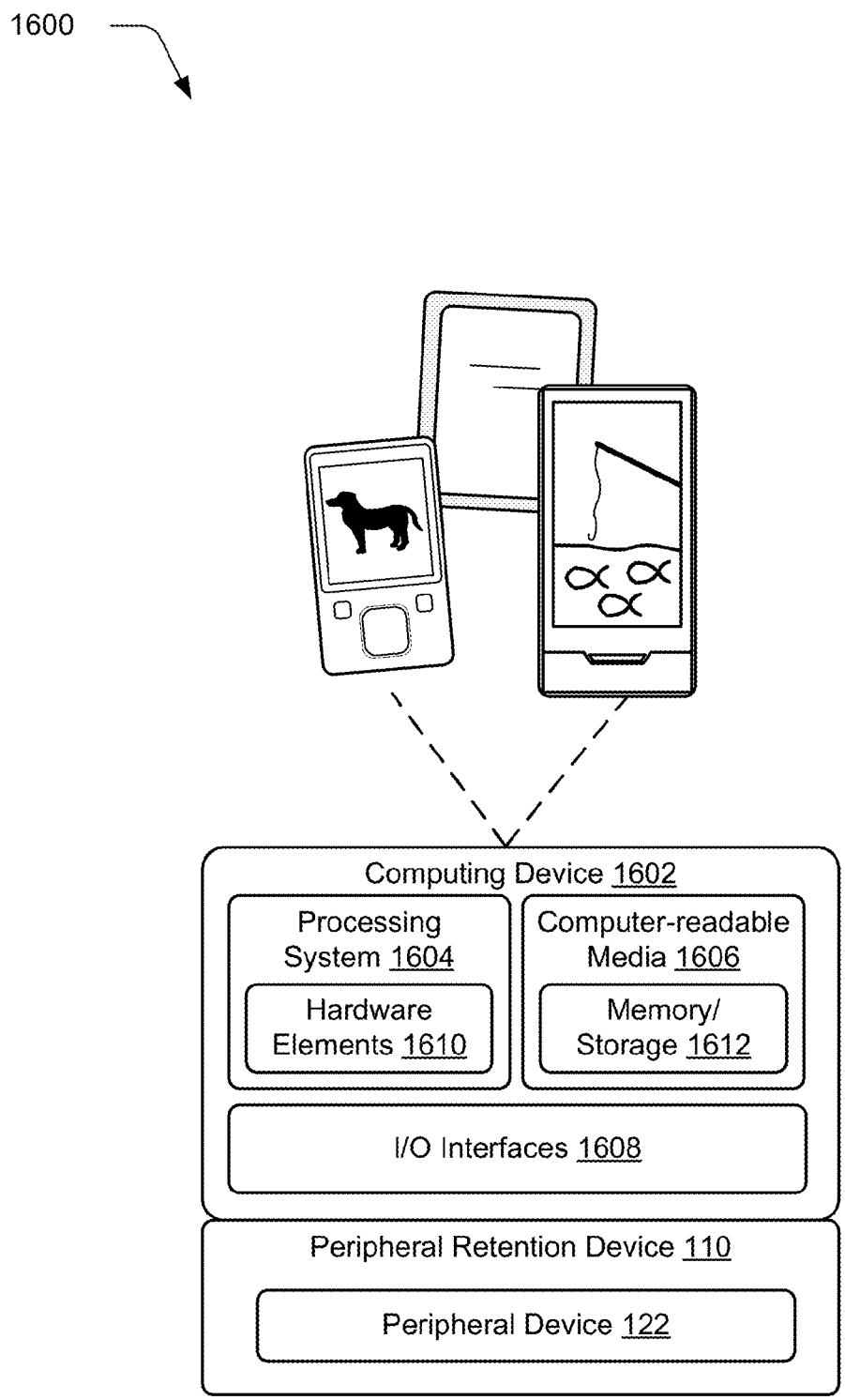
FIG. 16 illustrates an example system including various components of an example device that can be implemented as any type of computing device as described with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. The computing device 1602 may be, for example, be configured to assume a mobile configuration through use of a housing formed and size to be grasped and carried by one or more hands of a user, illustrated examples of which include a mobile phone, mobile game and music device, and tablet computer although other examples are also contemplated. A peripheral retention device 110 is also included, which may be used to retain a peripheral device 122 as described above.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways to support user interaction.

The computing device 1602 is further illustrated as being physically coupled to a peripheral device 1614 that is physically removable from the computing device 1602, e.g., using magnetism. In this way, a variety of different input devices may be coupled to the computing device 1602 having a wide variety of configurations to support a wide variety of functionality.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A peripheral retention device comprising:
  a computing device securing portion configured to removably engage a computing device such that the computing device securing portion is securable to and removable from a cavity on a first side of a housing of the computing device using one or more hands of a user; and
  a peripheral securing portion connected to the computing device securing portion and configured to removably engage a peripheral device via a second side of the housing that opposes the first side of the housing such that the peripheral device is securable to and removable from the peripheral securing portion using one or more hands of a user, the computing device securing portion configured to be secured to the cavity on the first side of the housing by pulling the peripheral securing portion from the first side of the housing through the cavity to the second side of the housing that opposes the first side of the housing.

2. A peripheral retention device as described in claim 1, wherein the computing device securing portion is securable to and removable from the housing using a magnetic attachment or an adhesive.

3. A peripheral retention device as described in claim 1, wherein the computing device securing portion, when secured to the housing, has a retention force to the housing that is sufficient to remain secured when the peripheral device, secured to the peripheral securing portion, is grasped by the one or more hands of the user and used to lift the computing device without the computing device being otherwise supported.

4. A peripheral retention device as described in claim 1, wherein the computing device has a slate configuration that is configured to be held by the one or more hands of a user.

5. A peripheral retention device as described in claim 1, wherein the housing is part of a kickstand of the computing device that is moveable between a retracted position and an extend position suitable to support the computing device in an upright configuration when placed on a surface.

6. A peripheral retention device as described in claim 1, wherein the computing device securing portion is securable to and removable from the housing using a mechanical attachment.

7. A peripheral retention device as described in claim 6, wherein the mechanical attachment is accomplished through flexing of the computing device portion within the cavity of the housing such that the flexing causes edges of the computing device securing portion to engage edges of the cavity.

8. A peripheral retention device as described in claim 1, wherein the peripheral retention device is formed from a flexible material.

9. A peripheral retention device as described in claim 8, wherein the flexible material is elastic.

10. A peripheral retention device as described in claim 8, wherein the flexible material is configured to be disposed between the housing and a surface on which the computing device is placed and flex to assume a flattened configuration in response.

11. A peripheral retention device as described in claim 8, wherein the peripheral device is a stylus.

12. A computing device comprising:
  a display device;
  a housing having a form factor configured to be held by one or more hands of a user, the housing including a kickstand that is movable to support different viewing positions of the display device as secured to the housing, the kickstand configured to removably engage a peripheral retention device such that the peripheral retention device is securable to and removable from the kickstand using one or more hands of a user, the peripheral device is securable to and removable from the peripheral retention device using the one or more hands of a user, the peripheral retention device configured to be secured to a cavity on a first side of the kickstand by pulling a peripheral securing portion of the peripheral retention device from a first side of the kickstand through the cavity to a second side of the kickstand that opposes the first side of the kickstand; and one or more modules implemented at least partially in hardware and configured to perform one or more operations responsive to inputs received from the peripheral device.

13. A computing device as described in claim 12, wherein the kickstand is configured to removably engage the peripheral retention device via a first side of the kickstand and secure the peripheral device via an opposing second side of the kickstand.

14. A computing device as described in claim 12, wherein the peripheral retention device is securable to and removable from the kickstand using a mechanical attachment.

15. A computing device as described in claim 14, wherein the mechanical attachment is accomplished through flexing of a computing device securing portion of the peripheral retention device within the cavity of the kickstand such that the flexing causes edges of the computing device securing portion to engage edges of the cavity.

16. A computing device as described in claim 15, wherein the computing device securing portion, when secured to the housing, has a retention force to the housing that is sufficient to remain secured when the peripheral device, secured to the peripheral retention device, is grasped by the one or more hands of the user and used to lift the computing device without the computing device being otherwise supported.

17. A system comprising:
 a stylus; and
 a computing device including a housing having a handheld configuration, the housing including a kickstand that is movable to support different viewing positions of a display device as secured to the housing, the kickstand configured to removably engage a peripheral retention device such that the peripheral retention device is securable to and removable from the kickstand using one or more hands of a user, the stylus is securable to and removable from the peripheral retention device using the one or more hands of a user, the peripheral retention device configured to be secured to a cavity on a first side of the kickstand by pulling a peripheral securing portion of the peripheral retention device from a first side of the kickstand through the cavity to a second side of the kickstand that opposes the first side of the kickstand.

18. A system as described in claim 17, wherein the computing device is a mobile phone or tablet computer.

19. A system as described in claim 17, wherein the stylus is configured to support user interaction with a user interface output by the display device of the computing device.

20. A system as described in claim 19, wherein the interaction is supported using touchscreen functionality.

* * * * *